Figure 1:
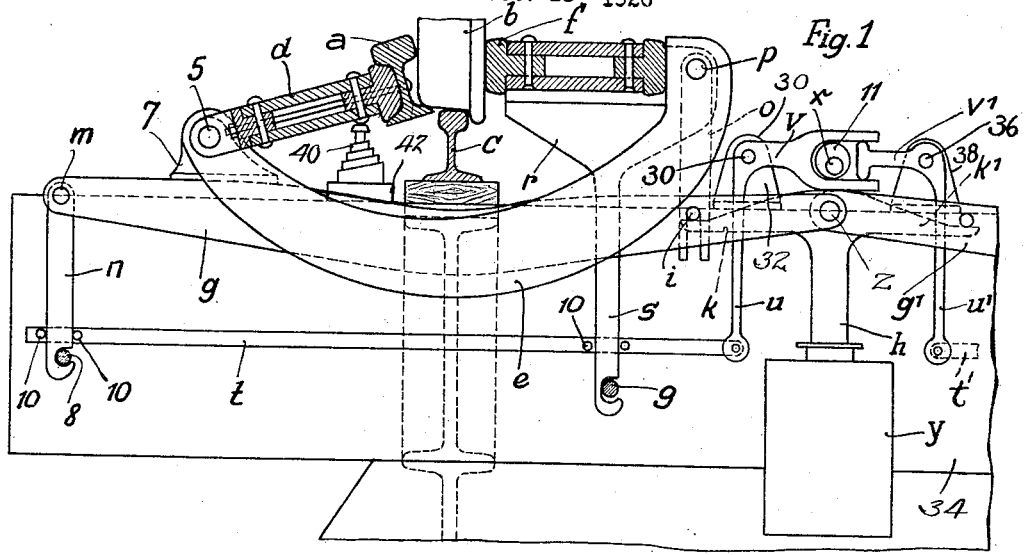

May 2, 1933.  K. E. WENZEL  1,906,347
TRACK BRAKE
Filed Oct. 18, 1926

Inventor.
Karl Ernst Wenzel
C. P. Goepel
his attorney

Patented May 2, 1933

1,906,347

UNITED STATES PATENT OFFICE

KARL ERNST WENZEL, OF HAMBORN-ON-THE-RHINE, GERMANY, ASSIGNOR, BY MESNE ASSIGNMENTS, TO THE HANNAUER CAR RETARDER COMPANY, OF CHICAGO, ILLINOIS, A CORPORATION OF ILLINOIS

TRACK BRAKE

Application filed October 13, 1926, Serial No. 142,283, and in Germany October 19, 1925.

My invention relates to improvements in track brakes, and more particularly in track brakes of the type in which the braking power is automatically controlled by the car according to the load thereof, the brake shoe being in the form of a rail engaging one of the side faces of the wheel to be braked and adapted to be depressed by the said wheel and cooperating with a second rail located in position for engaging the opposite side face of the wheel. An object of this improvement is to provide a brake of this type in which the same pressure cylinder and piston are used for elevating the brake into braking position and for braking, and in which in both cases the power of the cylinder is completely utilized. With this object in view I construct the beam supporting the brake rails so that it finds a rigid fulcrum only after lifting the brake into braking position, the said beam being jointed at one end to the piston rod and having in addition a second support on an arm projecting laterally from the said rod, so that it can be elevated by the piston rod. At the opposite end the beam is provided with a supporting member which is adapted to be set into supporting position after lifting the beam and to provide a fulcrum for the beam. Thus the said piston acts through a long lever, and the cylinder is fully made use of when braking, so that when reducing the pressure of the pressure medium for varying the braking power, no pressure fluid is wasted.

Preferably the brake shoe cooperating with the braking rail adapted to be depressed by the wheel of the car is likewise supported on a member adapted to be set into supporting position for holding the said brake shoe at a definite height while braking, so that the braking power is always exerted by the said shoe at comparatively high points of the rim of the wheel. Preferably common means are provided for setting the said supporting members of the beam and the brake shoe into and out of supporting positions.

Preferably the braking rail adapted to be depressed by the wheel of the car is constructed so that its length of leverage remains substantially constant while braking. In one construction the rocking lever carrying the said rail is provided at its end with a cam rolling on a supporting face provided on the said beam. In a modification the said rocking lever has two fulcrums, the subsidiary fulcrum coming into operation after the rail has been depressed. Finally, a parallel guide may be provided for the said braking rail moving downwardly, the said rail being jointed to the rocking lever carrying the same and to a link insuring parallel movement.

Figure 2:
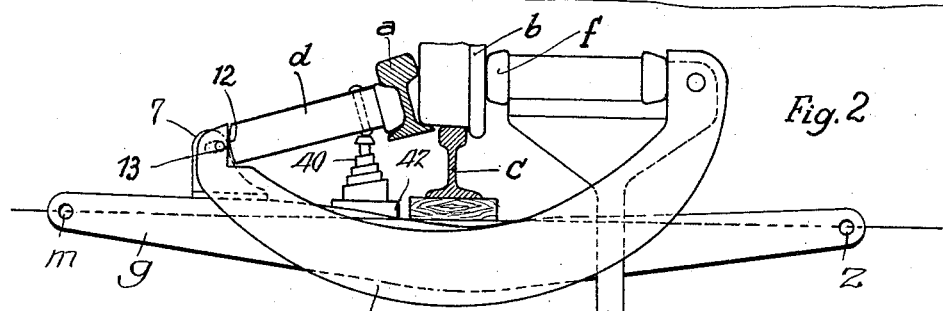
Figure 3:
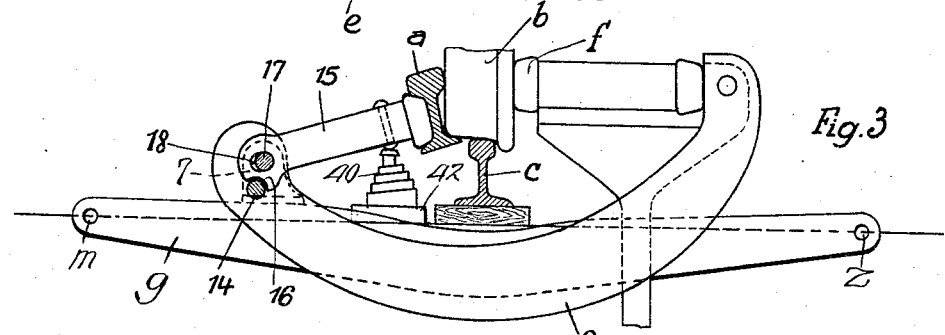
Figure 4:
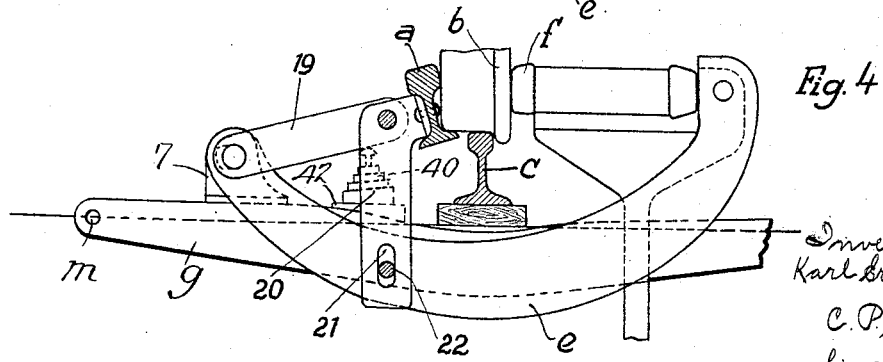

For the purpose of explaining the invention several examples embodying the same have been shown in the accompanying drawing, in which the same reference characters have been used in all the views to indicate corresponding parts. In said drawing, Fig. 1 is an elevation of the brake partly in section, and Figs. 2, 3 and 4 are detail elevations showing modifications of the brake, certain of the operating mechanism being omitted.

The general construction of the brake has been described in the U. S. patent to Frölich No. 1,495,320.

In the example shown in Fig. 1 my improved brake comprises a rail or shoe $a$ which in the example shown in the figure engages the outer face of the car wheel $b$, the inner flange of the said rail being located in position to have the car wheel $b$ roll thereon. The rail $a$ is secured to a rocker $d$ having its fulcrum at 5 on a lever $e$ jointed to a rocker $r$ by the pivot $p$, said rocker $r$ carrying the second brake shoe or rail $f$. The member $d$, as shown, is resiliently supported on the spring 40 mounted on the housing 42, said housing being disposed on the beam $g$. In the modifications shown in Figures 2 and 3, the members $d$ and 15 are similarly resiliently supported. The lever $e$ is mounted on a beam $g$ by means of a slidable bracket 7 and a rod $o$ pivoted to the lever at $p$, the lever $e$ being pivoted to the fulcrum 5 which is preferably loosely mounted on the bracket 7. The right hand end of the beam $g$ as viewed in Figure 1, is pivoted to a piston rod $h$ as by means of a bolt $z$, and the said piston rod is made integral with an arm $k$ projecting laterally therefrom and providing a support for the pin or projection *i* fixed to the beam *g*. To the left hand end of the beam *g* a rod *n* is pivoted at *m*. The pin *i* provides a support for the rod *o* pivoted to the lever *e* and the rocker *r*, said rocker being provided with a depending arm *s*. The said arm *s* and the rod *n* are hook-shaped at their bottom ends and are adapted to be supported on fixed pins or supports 9 and 8 respectively. The rods *n* and *s* are acted upon by a rod *t* provided with pins 10 engaging the said rods, said rod *t* being pivoted to a bell crank lever *u*, the horizontal arm *v* of which is bifurcated and engaged by a cam disk 11 secured to a rock shaft *x*. The bell crank *u* is pivotally mounted as at 30 to a support 32 fixed to the foundation 34. The rock shaft *x* is rotatively carried by supports or brackets (not shown) spaced at suitable intervals along the track and fixed to the foundation 34. Thus by rocking the disk 11 through any suitable means the rod *t* is shifted transversely of the track to move the rod *n* and arm *s* into and out of engagement with the supports 8 and 9. The piston of the piston rod *h* is disposed within a cylinder *y* and controlled by suitable pressure fluid supplied to said cylinder, said cylinder being preferably located symmetrically between the rails *c* of the track. As shown the same cylinder *y* and piston are used for acting on the brake shoes for both wheels, Fig. 1 showing the beam *g'* carrying the brake of the said second wheel, the bell crank lever *u'* and the arm *k'*. The bell crank *u'* is pivoted at 36 to the support 38 fixed to the foundation 34, and said bell crank is provided with an arm *v'* having an enlarged head loosely mounted within the jaws of the bifurcated arm *v* of the bell crank *u* for actuation by said bell crank. the depending arm of the bell crank *u'* being pivoted to rod *t'* operating shoes similar to shoes *a* and *f*.

The operation of the brake is as follows, it being understood that the operation of both sets of brakes is the same: For lifting the brake into the braking position shown in Fig. 1, fluid is admitted under pressure to the cylinder *y*, so that the piston *h* lifts the beam *g* by means of the bolt *z* and the pin *i*. After the beam *g* has arrived in elevated position the shaft *x* is rocked so as to shift the rod *t* inwardly. Thereby the rod *n* and arm *s* are thrown into position for being supported on the bolts 8 and 9. Simultaneously the same operations are performed in the brake mechanism acting on the opposite car wheel *b*. If now the wheel *b* rolls on the flange of the rail *a* it is pressed in the manner known in the art between the rails *a* and *f*, and a pressure is exerted through bracket 7 on the beam *g* which is opposite to the pressure exerted by the pressure fluid on the piston *h*. The beam *g* is rocked about its fulcrum *m*, the piston rod *h* acting at the end of a very long lever *m—z*. Thus the volume of the cylinder *y* is utilized, and when reducing the air pressure while braking no compressed air is wasted, though the same cylinder is used for lifting the brake into braking position. By supporting the rocker *r* on the arm *s* the brake rail *f* engages the wheel at a very high point, which is important for an effective braking action.

To release the braking device, or for moving the shoes to inoperative position, the cam 11 is rotated substantially 180° from the position shown in Figure 1, causing the bell cranks *u* and *u'* to move the rods *t* and *t'* outwardly whereby the respective members *n* are released from pins 8. The fluid in the piston *y* can then be released, causing the piston rod *h* to move downwardly whereby the beam members *g* and *g'* and consequently the brake shoes move downwardly to inoperative position where they will no longer be engaged by a vehicle wheel passing along the rails.

In the following modifications shown in Figures 2 to 4 inclusive it is of course understood that the operating mechanism is that as shown in Figure 1 and described above, even though these figures show only that portion of the mechanism adjacent one rail. It might be added that when the wheel engages the shoe on the outside of the rail, depressing the same to cause movement of the other shoe to braking position through the linkages described, there is a tendency to depress the beam *g*. As the support *n*, however, prevents bodily movement of the beam, the beam pivots about point *m*, causing depression of the end of the beam at the point *z*, and this movement is cushioned and limitingly permitted by the cylinder *y*.

In the construction shown in Fig. 2 the rocker *d* of the rail *a* is formed with a cam face 12 rolling on a face 13 of the lever *e*. Thereby a constant leverage is insured when the rocker *d* is rocked downwardly.

In the modification shown in Fig. 3 a similar result is obtained by providing a second fulcrum 14 for the rocker 15 adapted to be engaged by a lug 16 of the rocker 15 after the rail has been partly depressed. The bolt 17 has a suitable clearance within the bore 18 of the rocker.

In Fig. 4 I have shown a modification in which the rail *a* is jointed to the rocker 19 and provided with a downwardly depending arm 20 formed with a slot 21 engaged by a bolt 22 of the lever *e*. Thereby the rail *a* is guided substantially parallel.

It might be added that, when the wheel engages the shoe on the outside of the rail, depressing the same to braking position through the linkages described, there is a tendency to depress the beam *g*. As the support *n*, however, prevents bodily movement of the beam, the beam pivots about point *m*, causing depression of the end of the beam at the point $z$, and this movement is cushioned and limitingly permitted by the cylinder $y$.

While in describing the invention reference has been made to particular examples embodying the same I wish it to be understood that my invention is not limited to the constructions shown in the drawing, and that various changes may be made in the general arrangement of the apparatus and the construction of its parts without departing from the invention.

I claim:

1. A track brake, comprising a braking rail located alongside the rail of the track and having a flange adapted to have the car wheel rolling thereon, a rocker carrying the said braking rail, a member on which said rocker is rockingly mounted, a beam on which said member is supported, a member adapted to be elevated by fluid pressure and jointed to one end of said beam and providing an additional support at a point away from said end, and means to support said beam when in elevated position at the end opposite to said last-named member.

2. A track brake, comprising a braking rail located alongside the rail of the track and having a flange adapted to have the car wheel rolling thereon, a rocker carrying the said braking rail, a member on which said rocker is rockingly mounted, a second braking rail mounted on said member, a beam on which said member is supported, a member adapted to be elevated by fluid pressure and jointed to one end of said beam and providing an additional support at a point away from said end, and means to support said beam when in elevated position at the end opposite to said last-named member.

3. A track brake, comprising a braking rail located alongside the rail of the track and having a flange adapted to have the car wheel rolling thereon, a rocker carrying the said braking rail, a member on which said rocker is rockingly mounted, a second rail rockingly mounted on said member, means to support said second rail in elevated position, said rails being adapted for engagement with the car wheel respectively from opposite sides thereof, a beam on which said member is supported, a member adapted to be elevated by fluid pressure and jointed to one end of said beam and providing an additional support at a point away from said end, and means to support said beam when in elevated position at the end opposite to said last-named member.

4. A track brake, comprising a braking rail located alongside the rail of the track and having a flange adapted to have the car wheel rolling thereon, a rocker carrying the said braking rail, a member on which said rocker is rockingly mounted, a second rail rockingly mounted on said member, means to support said second rail in elevated position, said rails being adapted for engagement with the car wheel respectively from opposite sides thereof, a beam on which said member is supported, a member adapted to be elevated by fluid pressure and jointed to one end of said beam and providing an additional support at a point away from said end, means to support said beam when in elevated position at the end opposite to said member, and mechanism common to said supporting means for said second rail and said means to support said beam for setting said supporting means and said last-named means in supporting positions.

5. A track brake, comprising a pair of brake rails adapted to engage the car wheel from opposite sides thereof, rockers on which said rails are mounted and arranged in the manner of a toggle-joint, a member on which said rockers are mounted, and yielding supporting means for said member, one of said rockers having a plurality of fulcrums on said member located different distances away from said brake rails.

6. A track brake, comprising a pair of brake rails adapted to engage the car wheel from opposite sides thereof, rockers on which said rails are mounted and arranged in the manner of a toggle-joint, a member on which said rockers are mounted, and yielding supporting means for said member, one of said rockers having an arcuate fulcrum on said member.

7. In track brake mechanism, the combination of a brake shoe disposed adjacent a track rail and movable to a position to be engageable with a vehicle wheel operating on said track rail, means for maintaining said shoe in wheel engaging position, means for permitting movement of said means to inoperative position, and means for moving said shoe to operative wheel engaging position, said means being yieldable whereby the brake application is cushioned.

8. In apparatus of the character described, the combination with means movable transversely of the rail into gripping engagement with the side faces of car wheels as the car passes over the apparatus, and means for rockingly supporting said wheel gripping means in normal operative position comprising a beam extending transversely of the track and resilient pressure means for raising and lowering said beam, comprising a fluid actuated piston connected to substantially the center of said beam.

9. In apparatus for retarding the movement of railway cars, wheel engaging members disposed adjacent the track rails at opposite sides of the track and movable into frictional engagement with the side faces of railway car wheels, a beam extending transversely of the track and by which the said wheel engaging members are rockingly supported, and means for raising and lowering said beam for increasing or reducing, respectively, the pressure of said engaging members against said wheels.

10. In apparatus for retarding movement of railway cars, wheel engaging devices including rocking means disposed on opposite sides of the track rail for engaging the wheels of a car, means for releasably holding said devices in their normal operative position, and means for releasing said holding means.

11. A track brake, comprising a pair of brake rails adapted to engage the car wheel from opposite sides thereof, rockers on which said rails are mounted and arranged in the manner of a toggle-joint, a member on which said rockers are mounted, and yielding supporting means for said member, one of said rockers having two bearing faces each cooperating with a bearing face formed on said member mounted for successive engagement with the bearing faces on said rocker.

12. A track brake, comprising a pair of brake rails adapted to engage the car wheel from opposite sides thereof, rockers on which said rails are mounted and arranged in the manner of a toggle-joint, a member on which said rockers are mounted, and yielding supporting means for said member, one of said rails having a downwardly extending arm vertically guided relatively to said member and having the cooperating rocker jointed thereto.

13. In a track brake system, the combination of a rail for accommodating a vehicle wheel, a rocker member extending on both sides of said rail, brake shoes mounted adjacent said rail, one of said shoes being pivotally mounted at a plurality of points to said rocker member.

14. In a track brake system, the combination of a rail for accommodating a vehicle wheel, a rocker member extending on both sides of said rail, brake shoes mounted adjacent said rail, one of said shoes being pivotally mounted on said rocker member, said rocker member and shoe being provided with means whereby when said shoe is depressed said rocker member is moved.

15. In a track brake system, the combination of a rail for accommodating a vehicle wheel, a rocker member extending on both sides of said rail, brake shoes mounted adjacent said rail, one of said shoes being pivotally mounted on said rocker member by a lever having a shoulder, said rocker member having a member thereon engageable by said shoulder whereby when said shoe is depressed said rocker member is moved.

16. In a track brake system, the combination of a rail for accommodating a vehicle wheel, a rocker member extending on both sides of said rail, brake shoes mounted adjacent said rail, and a cam provided between one of said shoes and said rocker member whereby movement of said shoe imparts movement to said rocker member through said cam.

17. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke.

18. In track brake mechanism, the combination of a brake shoe associated with a rail, a support for said shoe, and means connecting said support and shoe whereby said shoe is depressed in a direction substantially parallel to and by a wheel operating along said rail, said means including a member pivotally mounted with respect to said shoe and cooperating therewith and contacting said support.

19. In track brake mechanism, the combination of a brake shoe associated with a rail, a movable support for said shoe, and means connecting said support and shoe whereby said shoe is depressed in a direction substantially parallel to and by a wheel operating along said rail, said means including a member secured to said shoe and loosely connected for translational movement to said support.

20. In track brake mechanism, the combination of a brake shoe associated with a rail, a support for said shoe, means connecting said support and shoe whereby said shoe is depressed in a direction substantially parallel to and by a wheel operating along said rail, said means including a member secured to said shoe and loosely connected to said support, and a member pivoted to said support and contacting said last named member.

21. In track brake mechanism, the combination of a track rail, brake shoes disposed on both sides of said rail for imparting braking action to wheels operative on said rail, a support for said shoes, supporting means between said support and one of said shoes, and means disposed between one of said shoes and said support and including a member loosely pivoted to said support for sliding movement with respect thereto whereby said shoe is depressed in a direction substantially parallel to and by a wheel operating along said rail and said other shoe is moved to braking position.

In testimony whereof I hereunto affix my signature.

KARL ERNST WENZEL.